(12) United States Patent
Sawamura

(10) Patent No.: US 6,357,878 B1
(45) Date of Patent: Mar. 19, 2002

(54) OPTICAL SYSTEM FOR A PROJECTOR

(75) Inventor: Shigeru Sawamura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/480,283

(22) Filed: Jan. 10, 2000

(30) Foreign Application Priority Data

Jan. 18, 1999 (JP) .......................................... 11-008674

(51) Int. Cl.$^7$ ............................................. G03B 21/00
(52) U.S. Cl. ............................ 353/33; 353/52; 353/81; 353/99; 348/771
(58) Field of Search ............................. 353/31, 33, 34, 353/37, 98, 99, 81, 52, 56; 345/31, 108; 348/771, 742, 743

(56) References Cited

U.S. PATENT DOCUMENTS

| | | | | |
|---|---|---|---|---|
| 5,552,922 A | * | 9/1996 | Magarill ........................ | 353/81 |
| 5,612,753 A | | 3/1997 | Poradish et al. ............. | 348/743 |
| 5,633,755 A | | 5/1997 | Manabe et al. .............. | 359/443 |
| 5,704,701 A | * | 1/1998 | Kavanagh et al. ............ | 353/33 |
| 5,777,789 A | * | 7/1998 | Chiu et al. ..................... | 353/37 |
| 5,865,520 A | * | 2/1999 | Kavabagh et al. ............ | 353/31 |
| 5,868,480 A | | 2/1999 | Zeinali ......................... | 353/31 |
| 5,905,545 A | | 5/1999 | Poradish et al. ............. | 348/743 |
| 5,967,636 A | * | 10/1999 | Stark et al. .................... | 353/84 |

FOREIGN PATENT DOCUMENTS

| | | |
|---|---|---|
| JP | 9-96867 A | 4/1997 |
| JP | 9-98442 A | 4/1997 |
| WO | WO 96/36184 | 11/1996 |

* cited by examiner

*Primary Examiner*—William Dowling
(74) *Attorney, Agent, or Firm*—Sidley Austin Brown & Wood

(57) ABSTRACT

An optical apparatus has a reflection-type spatial light modulator having a plurality of minute variable-reflection-angle mirrors that individually deflect the light incident thereon in one of two different directions, namely in a first direction or in a second direction, in accordance with a signal fed in, an optical system to which the light deflected in the first direction by the modulator is directed, a prism disposed between the modulator and the optical system so as to direct the light deflected in the first direction by the modulator to the optical system and direct the light deflected in the second direction by the modulator to a side face of the prism, and a light-absorbing member shaped like a plane-parallel plate and disposed with an entrance face thereof kept in close contact with the side face of the prism. The light-absorbing member is so designed that the light deflected in the second direction by the modulator enters the light-absorbing member through the entrance face thereof but does not exit from the light-absorbing member through the entrance face back into the prism.

27 Claims, 5 Drawing Sheets

OPTICAL SYSTEM FOR A PROJECTOR

This application is based on application No. H11-008674 filed in Japan on Jan. 18, 1999, the entire content of which is hereby incorporated by reference.

BACKGROUND OF THE INVENTION

1. Field of the Invention

The present invention relates to an optical system for a projector, and particularly to such an optical system for a projector as incorporates a reflection-type spatial light modulator, such as a digital mirror device™ (or DMD™ for short, manufactured by Texas Instruments Incorporated; hereinafter referred to simply as a digital mirror device or DMD), that is provided with a large number of variable-reflection-angle mirror elements that can vary the reflection angle of the light incident thereon in accordance with a video signal so that only the light corresponding to the video signal will be reflected toward a projection optical system.

2. Description of the Prior Art

In recent years, as higher and higher resolution is desired in images in general, also in the field of projectors, development of techniques has been sought that achieve a substantial increase in the number of pixels without making the optical system larger. One attempt to meet such needs is the development of a projector employing a DMD.

A DMD is produced by forming a large number of minute rectangular high-reflectance mirror elements, of which the inclination is variable in accordance with a video signal, on a silicon memory chip by a process as used to manufacture a semiconductor device. A projector employing such a DMD, by varying the inclination of those mirror elements, controls the direction in which it reflects the illumination light incident thereon in such a way as to converge only the desired parts of the reflected light on a screen and thereby project a desired image thereon.

In accordance with a video signal, the individual mirror elements of a DMD, when in an on state, reflect light toward a projection optical system and, when in an off state, change their inclination to reflect light in a different direction so that the light will not enter the projection optical system. However, owing to restrictions imposed on the design of a projector, the light reflected from the mirror elements when they are in an off state is shone on a side-wall portion of a prism constituting a prism system disposed between the DMD and the projection optical system, and therefore there is a possibility of this light being further reflected therefrom so as to enter the projection optical system.

In particular, when the prism is surrounded by a medium, such as air, having a small refractive index, most of the above-mentioned light shone on the side-wall portion of the prism is reflected from the inner surface of the side-wall portion of the prism, and this greatly increases the amount of such secondary-reflection light. This secondary-reflection light (unnecessary, or stray, light), when it enters the projection optical system, may cause another image (a ghost) separate from the normal image to appear on the screen.

One way to prevent such entry of secondary-reflection light into the projection optical system is to form the side-wall portion of the prism into a diffusive surface that diffuses the light incident thereon. Another way is to paint the outer surface of the side-wall portion of the prism black, or to vapor-deposit on that surface a light-absorbing dielectric film, or to affix to that surface a member having a bottom surface so shaped as to absorb light so that this bottom surface will absorb light and convert it into heat.

The method of absorbing light and converting it into heat by the use of a member having a bottom surface so shaped as to absorb light is adopted, for example, in the projector-oriented optical system disclosed in Japanese Laid-Open Patent Application H9-96867. In this optical system, a heat-dissipating member having a comb-tooth-shaped bottom surface is arranged so as to face a side wall of a prism, with a shock-absorbing pad in between, in such a way that this bottom surface is kept in close contact with the shock-absorbing pad. In this optical system, the recessed portions of the comb-tooth-shaped bottom surface absorb light and convert it into heat, and the heat-dissipating member as a whole dissipates the resulting heat.

However, even if light is diffused, it is inevitable that part of the diffused light will enter the projection optical system. It is practically impossible to form a black thin film that completely absorbs the light incident thereon, and therefore, even if a black thin film is applied, some light, left unabsorbed, may enter the projection optical system. It is difficult to produce a member having so intricate a shape as to absorb completely the light incident thereon, and therefore it is inevitable that part of the incident light will be reflected or diffused in the vicinity of the protruding portions of the comb-tooth-shaped bottom surface of this member.

SUMMARY AND WORKING PRINCIPLE OF THE INVENTION

An object of the present invention is to provide a projector-oriented optical system in which entry of unnecessary light into a projection optical system is prevented more strictly than ever.

To achieve the above object, according to one aspect of the present invention, an optical apparatus is provided with: a reflection-type spatial light modulator having a plurality of minute variable-reflection-angle mirrors that individually deflect the light incident thereon in one of two different directions, namely in a first direction or in a second direction, in accordance with a signal fed in; an optical system to which the light deflected in the first direction by the modulator is directed; a prism disposed between the modulator and the optical system so as to direct the light deflected in the first direction by the modulator to the optical system and direct the light deflected in the second direction by the modulator to a side face of the prism; and a light-absorbing member shaped like a plane-parallel plate and disposed with an entrance face thereof kept in close contact with the side face of the prism. The light-absorbing member is so designed that the light deflected in the second direction by the modulator enters the light-absorbing member through the entrance face thereof but does not exit from the light-absorbing member through the entrance face back into the prism.

In this optical apparatus, preferably, the light-absorbing member is so designed that the distance t between the entrance face and a second flat face opposite to the entrance face fulfills the following condition:

$$t \geq [1-\{(n_1/n_2)\sin \alpha_1\}^2]^{1/2}/2K$$

where $n_1$ represents the refractive index of the prism, $n_2$ represents the refractive index of the light-absorbing member, $\alpha_1$ represents the minimum angle of incidence of light incident on the entrance face, and K represents the absorption coefficient of the light-absorbing member.

According to another aspect of the present invention, a projector is provided with: an illumination optical system that includes a light source and that emits the illumination light generated by the light source; a reflection-type spatial light modulator having a plurality of minute variable-reflection-angle mirrors that individually deflect the illumination light emitted from the illumination optical system in one of two different directions, namely in a first direction or in a second direction, in accordance with a signal fed in; a projection optical system to which the light deflected in the first direction by the modulator is directed; a prism disposed between the modulator and the optical system so as to direct the illumination light emitted from the illumination optical system to the modulator, direct the light deflected in the first direction by the modulator to the optical system, and direct the light deflected in the second direction by the modulator to a side face of the prism; and a light-absorbing member shaped like a plane-parallel plate and disposed with an entrance face thereof kept in close contact with the side face of the prism. The light-absorbing member is so designed that the light deflected in the second direction by the modulator enters the light-absorbing member through the entrance face thereof but does not exit from the light-absorbing member through the entrance face back into the prism.

In this projector, preferably, the light-absorbing member is so designed that the distance t between the entrance face and a second flat face opposite to the entrance face fulfills the following condition:

$$t \geq [1-\{(n_1/n_2)\sin \alpha_1\}^2]^{1/2}/2K$$

where $n_1$ represents the refractive index of the prism, $n_2$ represents the refractive index of the light-absorbing member, $\alpha_1$ represents the minimum angle of incidence of light incident on the entrance face, and K represents the absorption coefficient of the light-absorbing member.

In the optical apparatus and the projector described above, the light shone on the side face of the prism enters the light-absorbing member. The light having entered the member is either absorbed by the member and thereby converted into heat or, if absorbed incompletely, driven out of the member. Here, the light driven out of the member is never driven out of the member through the face that is kept in close contact with the prism. Specifically, for example, the light-absorbing member is so designed that the light having entered the member is completely absorbed within the member before striking again the face that is kept in close contact with the prism. In this way, it is possible to prevent unnecessary light from returning to the prism (and thus entering the (projection) optical system).

Assume that FIG. 1 is a sectional view of the light-absorbing member used in the optical apparatus or projector described above along the plane that is perpendicular to both the first and second faces (what is called respectively the entrance face and the second flat face above) of the member. In FIG. 1, consider, for example, a case where light, coming from inside the prism 22, enters the light-absorbing member 5 through the bottom face 5$a$ thereof (i.e. the first face that is kept in close contact with the prism 22), at a position P1 thereon, is then reflected from the top face (the second face) 5$b$, at a position P2 thereon, and then travels toward the bottom face 5$a$, toward a position P3 thereon. Here, assume that the angle of incidence and the angle of emergence at the position P1 are $\alpha_1$ and $\alpha_2$, respectively, the distance between the bottom and top faces 5$a$ and 5$b$ (i.e. the thickness of the light-absorbing member 5) is t, the absorption coefficient of the light-absorbing member 5 is K, and the distance between P1 and P2, which equals the distance between P2 and P3, is L.

If the light that has entered the light-absorbing member 5 at the position P1 is absorbed before reaching the point P3 (i.e. while traveling an optical path length 2L), then $$1 \leq 2LK \tag{1}$$

Here, according to the trigonometric function, $$L = t/\cos \alpha_2 \tag{2}$$

According to Snell's law, $$n_1 \sin \alpha_1 = n_2 \sin \alpha_2$$

$$\sin \alpha_2 = (n_1/n_2)\sin \alpha_1 \tag{3}$$

Combining Expressions (2) and (3) gives $$L = t/[1-\{(n_1/n_2)\sin \alpha_1\}^2]^{1/2} \tag{4}$$

Substituting Expression (4) in Expression (1) gives $$1 \leq 2Kt/[1-\{(n_1/n_2)\sin \alpha_1\}^2]^{1/2}$$

$$t \geq [1-\{(n_1/n_2)\sin \alpha_1\}^2]^{1/2}/2K \tag{5}$$

As described above, for the light that has entered the light-absorbing member 5 at the position P1 to be absorbed before reaching the point P3 (i.e. while traveling an optical path length 2L), Expression (5) needs to be fulfilled. Expression (5) defines the lower limit of the thickness t of the light-absorbing member 5. Expression (5) shows that, the smaller the angle of incidence $\alpha_1$, the greater the lower limit of the thickness t. Accordingly, as long as the light-absorbing member 5 is so formed as to have a thickness t that fulfills Expression (5), assuming that the minimum angle of incidence of the light entering the member 5 through the bottom face 5$a$ thereof equals $\alpha_1$, light never returns to the prism through the bottom face 5$a$.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the accompanying drawings.

<First Embodiment>

Figure 1:
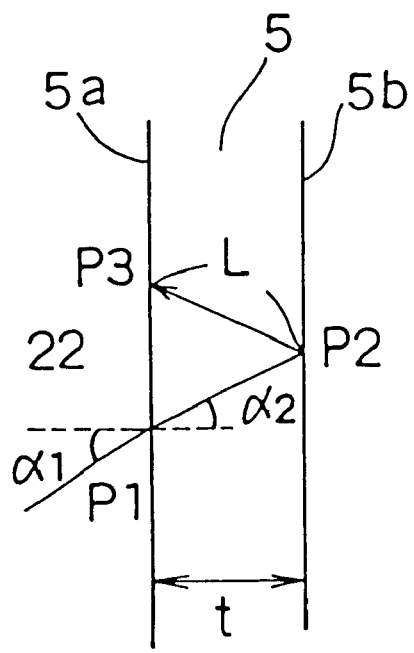
FIG. 1 is a diagram illustrating how the condition to be fulfilled by the angle between the top and bottom faces of the visible-light-absorbing member is determined.
Figure 2:
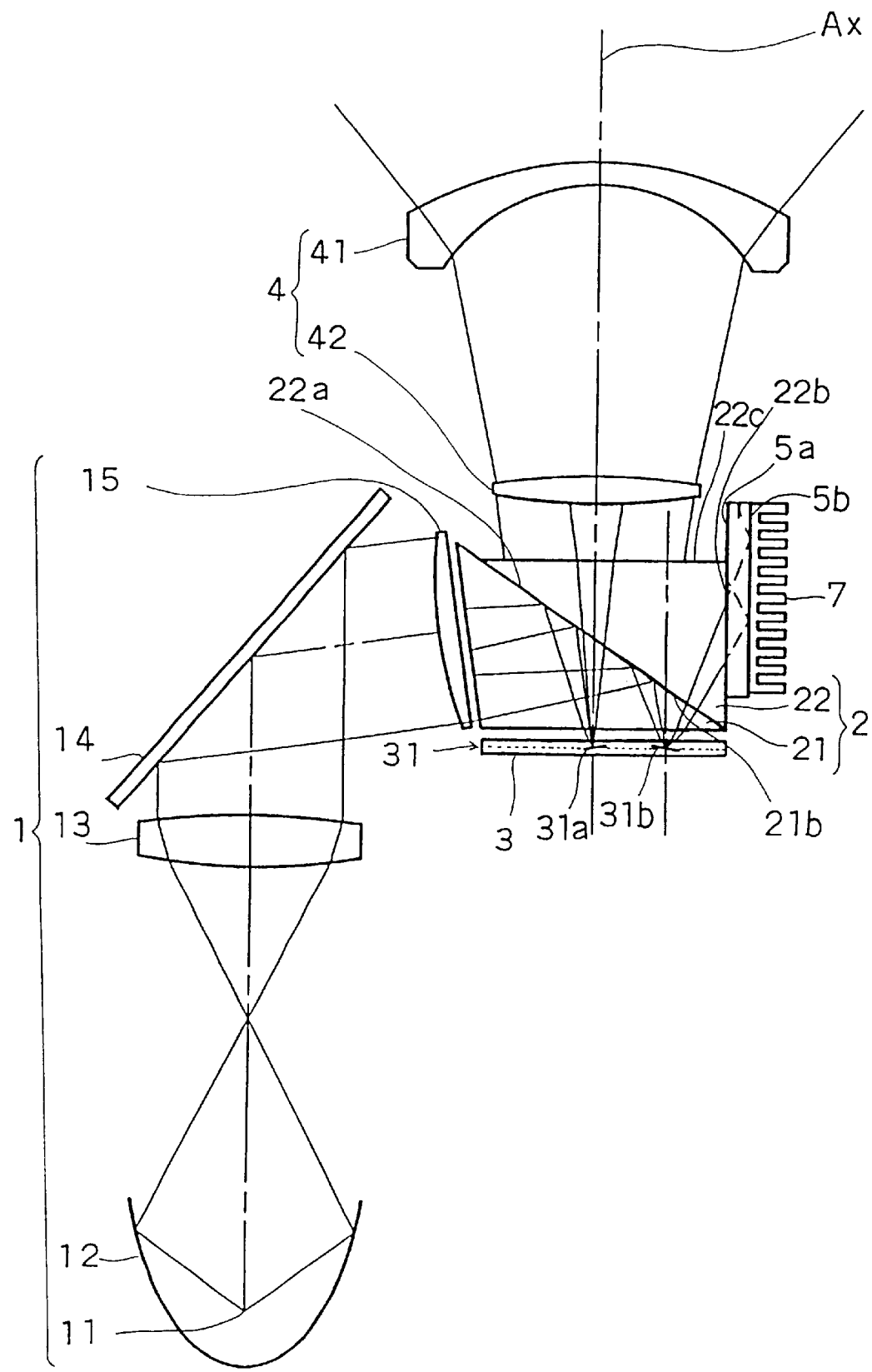
FIG. 2 is a horizontal sectional view of the projector-oriented optical system of a first embodiment of the invention.

FIG. 2 is a horizontal sectional view of the projector-oriented optical system of a first embodiment of the invention. This projector-oriented optical system is provided with an illumination optical system 1, an optical-path-splitting prism system 2, a DMD 3, and a projection optical system 4.

The illumination optical system 1 is composed of a light source 11 that emits white light, a reflector 12 that is a mirror with a surface having the shape of an ellipsoid of revolution, a parallel-beam-forming lens 13, a mirror 14, and a condenser lens 15. In the illumination optical system 1, the light emitted from the light source 11 is first reflected from the reflector 12, is then formed into a parallel beam by the parallel-beam-forming lens 13, is then reflected from the mirror 14, and is then condensed by the condenser lens 15, before the light is eventually directed, as illumination light, to the optical-path-splitting prism system 2.

The optical-path-splitting prism system 2 is composed of two prisms 21 and 22 that are cemented together in such a way that their respective faces 21b and 22a face each other with a layer of air in between. Owing to this cemented structure of the optical-path-splitting prism system 2, the illumination light that has entered the prism 21 through the face 21a thereof is totally reflected from the face 21b of the prism 21, and is thereby directed to the DMD 3.

The DMD 3 is provided with a mirror surface 31 formed of a huge number of mirror elements (rectangular mirrors made of aluminum) arranged on a substrate, and the direction in which the individual mirror elements constituting this mirror surface 31 reflect light can be switched between two directions (about 20° apart from each other). The switching of the reflection direction is achieved by the individual mirror elements, acting like pixels, being turned on and off in accordance with a video signal fed to the DMD 3. Of the entire light reflected from the mirror surface 31 of the DMD 3, the light reflected, as signal light, from the mirror elements in an on state, i.e. the light corresponding to the video signal, is transmitted through the optical-path-splitting prism system 2, and is then projected through the projection optical system 4 on a screen placed in front. The projection optical system 4 is composed of a plurality of lenses (of which only the front-end and rear-end lenses 41 and 42 are shown in FIG. 2).

As described above, this projector-oriented optical system employs only one DMD 3. In a case where this optical system is used to project a color image, a color wheel is additionally provided within the illumination optical system 1, and the color wheel is driven in such a way that light of three colors (R), (G), and (B) enters the DMD 3 cyclically, one color after another. In this case, the DMD 3 needs to be controlled in accordance with video signals corresponding to those three colors.

Now, the light reflected from the mirror surface 31 of the DMD 3 will be described. For simplicity's sake, only two 31a and 31b of the mirror elements constituting the mirror surface 31 are schematically shown in the figures referred to in the following descriptions. Here, it is assumed that the mirror element 31a is in an on state and the mirror element 31b is in an off state.

The light incident on the mirror surface 31 of the DMD 3 is fed, as described above, from the illumination optical system 1 through the optical-path-splitting prism system 2. Meanwhile, the light is made to strike the mirror surface 31 from a direction that forms a predetermined angle with the optical axis Ax of the projection optical system 4.

Of all the individual mirror elements constituting the mirror surface 31, those for which the pixel signals included in the video signal fed to the DMD 3 are on reflect the light incident thereon along the optical axis Ax of the projection optical system 4, and those for which the pixel signals are off reflect the light incident thereon toward a side wall 22b of the prism 22. As a result, a certain proportion of unnecessary light strikes the side wall 22b of the prism 22.

Figure 3:
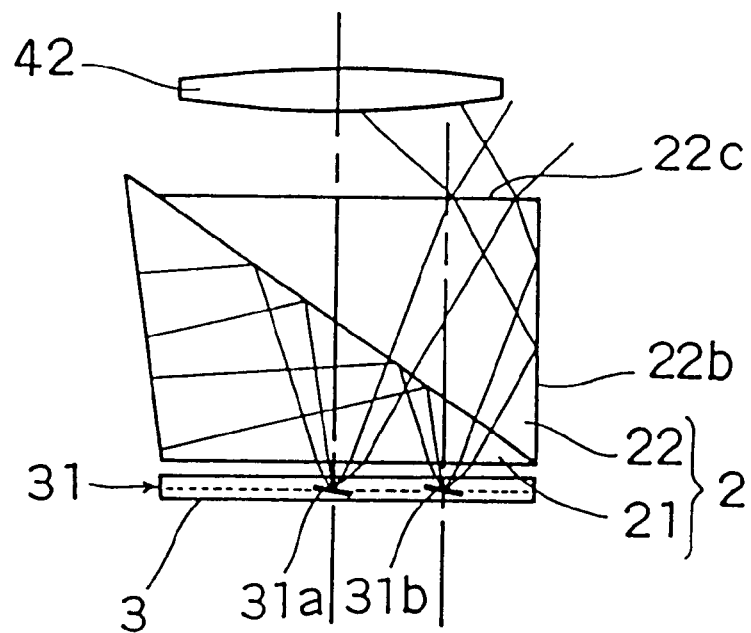
FIG. 3 is a sectional view of part of a projector-oriented optical system in which no measures are taken against unnecessary light.

Now, suppose that, as shown in FIG. 3, air exists outside this side wall 22b. Then, the light incident on this side wall 22b is totally reflected therefrom, and is thus allowed to travel forward, as secondary-reflection light, through the front face 22c of the prism (in FIG. 3, it is assumed that both of the mirror elements 31a and 31b are in an off state). As a result, in this construction, such secondary-reflection light is allowed to travel through the projection optical system 4 and is thereby made to converge in an unexpected position on the screen, causing an unexpected image (a ghost) to appear on the screen together with the normal projected image.

To prevent this, in this embodiment, a visible-light-absorbing member 5 for absorbing unnecessary light is affixed to the outer surface of the side wall 22b of the prism 22 (see FIG. 2). The visible-light-absorbing member 5 is made of a material (for example, ND glass) having a refractive index substantially equal to or higher than the prism 22 and having the property of absorbing visible light, and is affixed in such a way that the bottom face 5a thereof is kept in close contact with the outer surface of the side wall 22b. The visible-light-absorbing member 5 is a flat-plate-shaped member having a bottom face 5a and a top face 5b that are parallel to each other.

Since the visible-light-absorbing member 5 has a refractive index substantially equal to or higher than the prism 22, the unnecessary light striking the side wall 22b enters the visible-light-absorbing member 5 through the bottom face 5a thereof without being totally reflected at the interface in between. Here, the visible-light-absorbing member 5 is so designed that all light entering it is driven out of it through the top face 5b or is absorbed while traveling within it from the bottom face 5b, where the light enters it, to the top face 4a, where the light is reflected, and then back to the bottom face 5b. Specifically, Condition (5) noted previously is fulfilled by the absorption coefficient K and the thickness t of the member 5.

If, as shown in FIG. 2, the side wall 22b of the prism 22 is perpendicular to the mirror surface 31 of the DMD 3, the angle of incidence of unnecessary light striking the side wall 22b ranges from 0° to 90°. Within this range, the angle of incidence of strong unnecessary light ranges from 59.5° to 70.5°, and the angle of incidence of strong plus somewhat weak unnecessary light ranges from 51.7° to 83.4°. Here, strong unnecessary light refers to unnecessary light as will be observed clearly as a ghost when projected on the screen. On the other hand, somewhat weak unnecessary light refers to unnecessary light as will be observed dimly as a ghost and thus degrade the contrast of the normal image when projected on the screen.

Accordingly, if the thickness t fulfills Condition (5) when 59.5° is substituted therein as the minimum angle of incidence $\theta_1$, it is possible to prevent entry of strong unnecessary light into the projection optical system 4. Similarly, if the thickness t fulfills Condition (5) when 51.7° is substituted therein as the minimum angle of incidence $\theta_1$, it is possible to prevent entry of not only strong unnecessary light but also somewhat weak unnecessary light into the projection optical system 4. The greater the thickness t, the less unnecessary light enters the projection optical system 4; however, a thickness approximately equal to the lower limit of Condition (5), with 51.7° substituted therein, is sufficient to eliminate observable unnecessary light satisfactorily.

Figure 4:
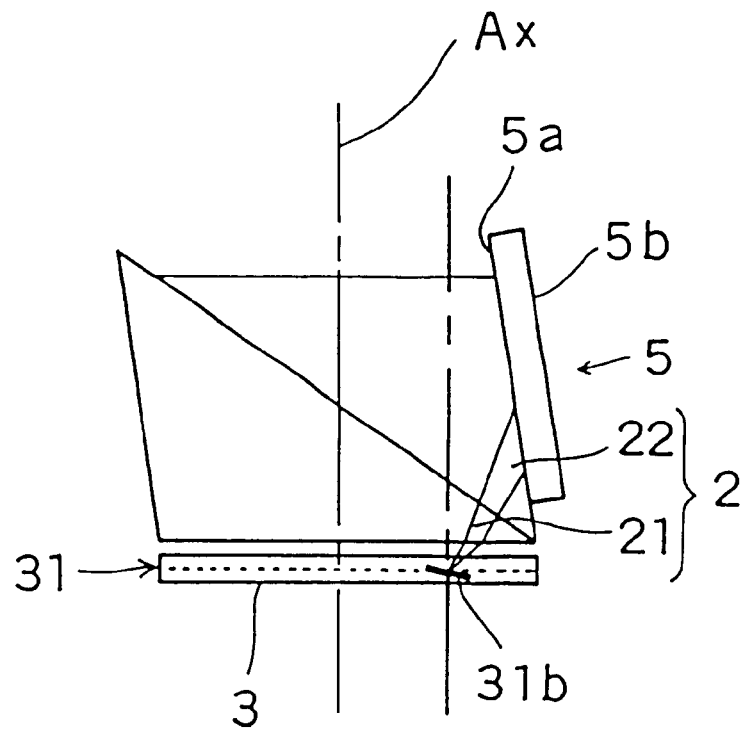
FIG. 4 is a sectional view of part of a projector-oriented optical system in which a side wall of a prism is arranged at 10° to a normal to the surface of a mirror.

In the projector-oriented optical system shown in FIG. 2, the side wall 22b of the prism 22 is perpendicular to the mirror surface 31 of the DMD 3. However, the side wall 22b does not necessarily have to be perpendicular to the mirror surface 31. FIG. 4 is a horizontal sectional view of a portion, including the prism system 2, visible-light-absorbing member 5, and DMD 3, of a projector-oriented optical system in which the side wall 22b is inclined approximately 10° toward the optical axis Ax as compared with the case shown in FIG. 2.

In this case, the angle of incidence of strong unnecessary light striking the side wall 22b ranges from 49.5° to 60.5°, and the angle of incidence of strong plus somewhat weak unnecessary light ranges from 41.7° to 73.4°. Here, the angle of incidence of unnecessary light has a different range, and therefore the minimum angle of incidence $\alpha_1$, which is to be substituted in Condition (5) in accordance with the desired level of reduction of unnecessary light, takes a different value than in the projector-oriented optical system shown in FIG. 2. To achieve the same level of reduction of unnecessary light as in the projector-oriented optical system shown in FIG. 2, the member 5 needs to be so shaped as to have a larger thickness t than that shown in FIG. 2.

In the construction described above, all unnecessary light entering the visible-light-absorbing member 5 through the bottom face 5a is either absorbed within the visible-light-absorbing member 5 or expelled through the top face 5b. Accordingly, almost no unnecessary light enters the projection optical system 4. The visible-light-absorbing member 5 uses its entire thickness t to absorb light, and thus prevents conduction of a large amount of heat to the prism as occurs in cases where a black thin film is used to absorb light. Even then, it is preferable to provide additionally a means for dissipating the heat generated within the visible-light-absorbing member 5. In this embodiment, a comb-shaped heat-dissipating member 7 for dissipating the heat generated in the member 5 is affixed to the top face 5b thereof.

<Second Embodiment>

Figure 5:
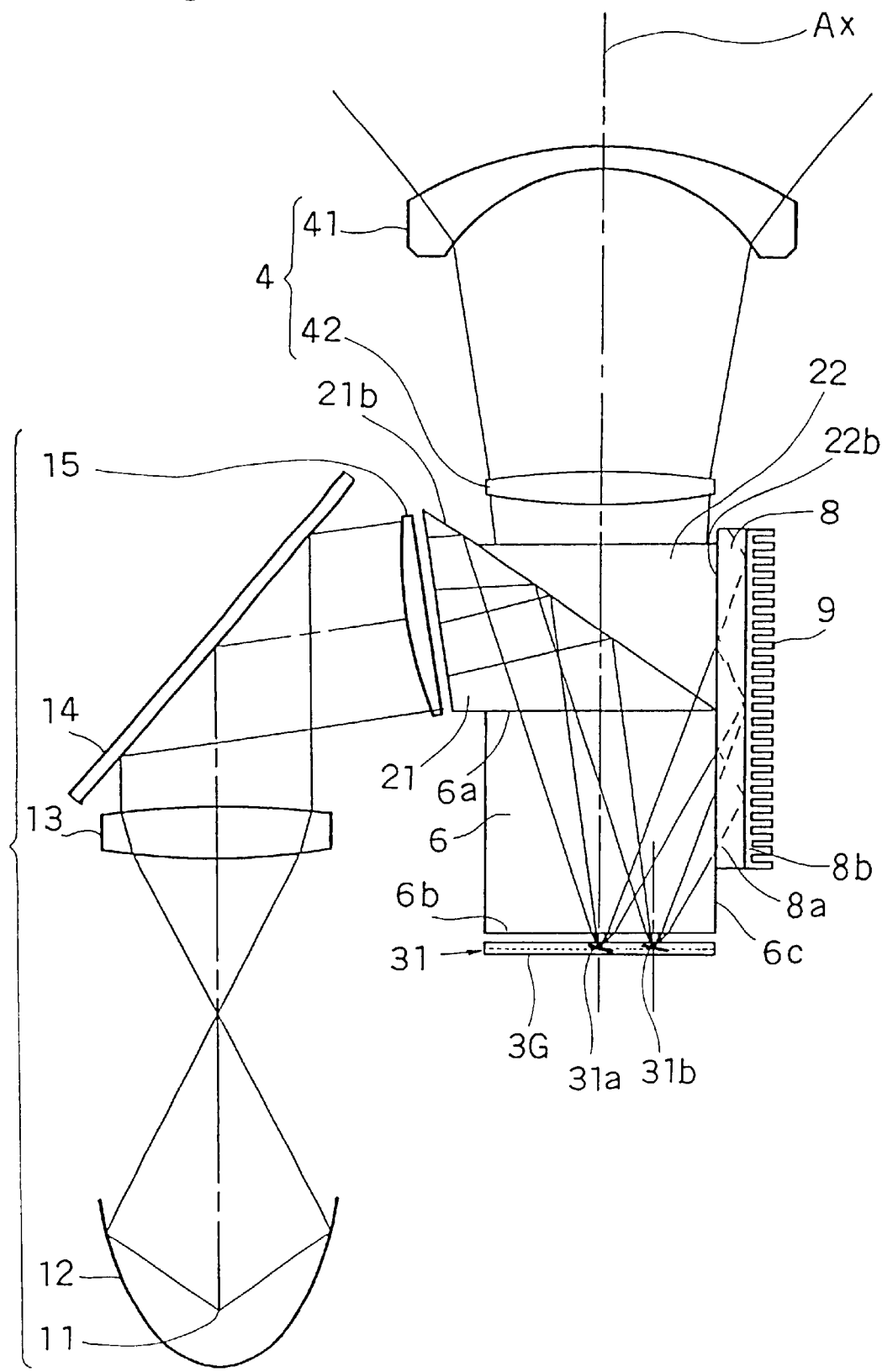
FIG. 5 is a horizontal sectional view of the projector-oriented optical system of a second embodiment of the invention.
Figure 6:
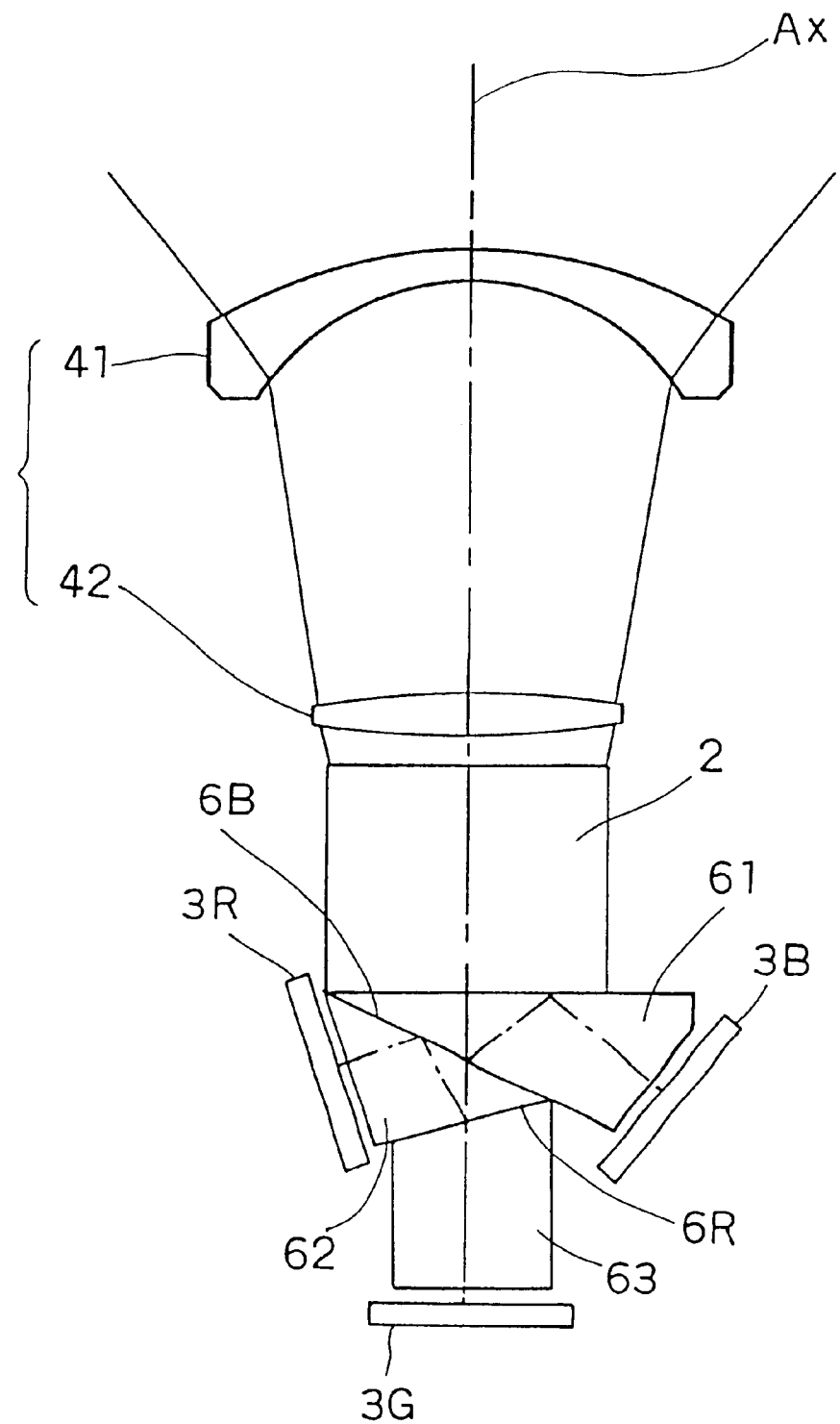
FIG. 6 is a vertical sectional view of the projector-oriented optical system of the second embodiment.

FIG. 5 is a horizontal sectional view of the projector-oriented optical system of a second embodiment of the invention, and FIG. 6 is a vertical sectional view thereof. In this projector-oriented optical system, the illumination optical system 1, the optical-path-splitting prism system 2, and the projection optical system 4 have the same constructions as in the first embodiment; therefore, such components as are common to both of the first and second embodiments are identified with the same reference numerals, and overlapping descriptions will not be repeated.

This projector-oriented optical system differs from that of the first embodiment in that it is provided with three DMDs 3R, 3G, and 3B and a three-color-separating prism system 6. The three-color-separating prism system 6 separates the light it receives into light of three colors, i.e. R (red), G (green), and B (blue) light, which is then fed individually to the corresponding DMDs 3R, 3G, and 3B. The optical images of three colors formed on these DMDs 3R, 3G, and 3B are integrated together by the three-color-separating prism system 6 into a single color image, which is then projected through the projection optical system 4 on a screen placed in front.

As shown in FIG. 6, the three-color-separating prism system 6 is composed of three prisms 61, 62, and 63 cemented together. At the interface between the prisms 61 and 62 is provided a dichroic layer 6B that reflects only B light, and at the interface between the prisms 62 and 63 is provided a dichroic layer 6R that reflects only R light. Thus, the white light coming from the optical-path-splitting prism system 2 is separated into light of three colors, i.e. R, G, and B light, which is then directed to the DMDs 3R, 3G, and 3B disposed behind the prisms 62, 63, and 61, respectively.

These DMDs 3R, 3G, and 3B each have the same structure as the DMD 3 of the first embodiment. Now, how these DMDs 3R, 3G, and 3B act will be described with reference to FIG. 5, taking up, for simplicity's sake, only the DMD 3G as their representative. As shown in FIG. 5, the front face 6a and the rear face 6b of the three-color-separating prism system 6 and the mirror surface 31 of the DMD 3G are perpendicular to the optical axis Ax of the projection optical system 4. The light incident on the mirror surface 31 of the DMD 3G is fed from the illumination optical system 1 through the optical-path-splitting prism system 2 and the three-color-separating prism system 6. Meanwhile, the light is made to travel through the front and rear faces 6a and 6b of the prism system 6 and then strike the mirror surface 31 from a direction that forms a predetermined angle with the optical axis Ax of the projection optical system 4.

The individual mirror elements constituting the mirror surface 31 vary their reflection direction in the same manner as in the first embodiment. Accordingly, as shown in FIG. 5, a certain proportion of the light reflected from the mirror elements for which the pixel signals included in the video signal fed to the DMD 3G are off strike the side wall 6c or 22b of the three-color-separating prism system 6 or the optical-path-splitting prism system 2. If air exists outside these side walls 6c and 22b, then, as in the case described previously with reference to FIG. 3, the light striking the side walls 6c and 22b is totally reflected therefrom so as to enter the projection optical system 4, causing a ghost to appear.

In this embodiment, as in the first embodiment, a visible-light-absorbing member 8 for absorbing unnecessary light is affixed to the outer surfaces of the side walls 6c and 22b, with the bottom face 8a thereof kept in close contact with those surfaces. The visible-light-absorbing member 8 is made of a material having a refractive index substantially equal to or higher than the glass material of which the prism systems 2 and 6 are made. The visible-light-absorbing member 8 is, like the visible-light-absorbing member 5, so designed that the thickness t thereof fulfills Condition (5).

Moreover, as in the first embodiment, a comb-shaped heat-dissipating member 9 for dissipating the heat generated in the member 8 is affixed to the top face 8b thereof. The unnecessary light having entered the visible-light-absorbing member 8 is driven out of it or absorbed within it in the same manner as in the visible-light-absorbing member 5 of the first embodiment, and therefore overlapping descriptions will not be repeated.

According to the present invention, it is possible to expel, or absorb within a visible-light-absorbing member, unnecessary light striking a side wall of a prism without fail and thereby prevent entry of unnecessary light into a projection optical system. This makes it possible to obtain ghost-free, high-contrast projected images. In addition, this can be achieved in a simple construction and simply by affixing an inexpensive member to the side wall of the prism.

Furthermore, in this construction, unnecessary light is converted into heat within the visible-light-absorbing member that has a sufficient thickness, and this helps prevent the prism from being subjected to an unduly heavy heat load. Considering the heat load to which the prism is subjected, an optical system according to the present invention is particularly useful as an optical system for a single-panel-type projector with a light source offering brightness of several hundred lumens; however, if provided additionally with a heat dissipating means, it is sufficiently useful also as an optical system for, for example, a three-panel-type projector with a light source offering higher brightness than that of a single-panel-type projector.

Obviously, many modifications and variations of the present invention are possible in light of the above teachings. It is therefore to be understood that within the scope of the appended claims, the invention may be practiced other than as specifically described.

What is claimed is:

1. An optical apparatus comprising:
    a reflection-type spatial light modulator having a plurality of minute variable-reflection-angle mirrors, the mirrors individually deflecting light incident thereon in one of two different directions, namely in a first direction or in a second direction, in accordance with a signal fed in;
    an optical system to which light deflected in the first direction by the modulator is directed;
    a first prism disposed between the modulator and the optical system so as to direct the light deflected in the first direction by the modulator to the optical system and direct light deflected in the second direction by the modulator to a side face of a second prism; and
    a light-absorbing member shaped like a plane-parallel plate and disposed with an entrance face thereof kept in close contact with the side face of the second prism, the light-absorbing member being so designed that the light deflected in the second direction by the modulator enters the light-absorbing member through the entrance face thereof but does not exit from the liht-absorbing member through the entrance face back into the second prism, and
    a non-planar heat-dissipating member disposed along a rear face of the light-absorbing member such that said light-absorbing member is between the heat-dissipating member and the second prism.

2. An optical apparatus as claimed in claim 1,
    wherein the optical system is a projection optical system that images light directed thereto on an image plane.

3. An optical apparatus as claimed in claim 1,
    wherein the light-absorbing member acts on light within a wavelength range of visible light.

4. An optical apparatus as claimed in claim 1,
    wherein the light-absorbing member is made of a medium that has a refractive index higher than a medium of which the prism is made.

5. An optical apparatus comprising:
    a reflection-type spatial light modulator having a plurality of minute variable-reflection-angle mirrors, the mirrors individually deflecting light incident thereon in one of two different directions, namely in a first direction or in a second direction, in accordance with a signal fed in;
    an optical system to which light deflected in the first direction by the modulator is directed;
    a prism disposed between the modulator and the optical system so as to direct the light deflected in the first direction by the modulator to the optical system and direct light deflected in the second direction by the modulator to a side face of the prism; and
    a light-absorbing member shaped like a plane-parallel plate and disposed with an entrance face thereof kept in close contact with the side face of the prism, the light-absorbing member being so designed that the light deflected in the second direction by the modulator enters the light-absorbing member through the entrance face thereof but does not exit from the light-absorbing member through the entrance face back into the prism,
    wherein the light-absorbing member is so designed that a distance t between the entrance face and a second flat face opposite to the entrance face fulfills the following condition:

$t \geq [1-\{(n_1/n_2)\sin \alpha_1\}^2]^{1/2}/2K$ where $n_1$ represents a refractive index of the prism, $n_2$ represents a refractive index of the light-absorbing member, $\alpha_1$ represents a minimum angle of incidence of light incident on the entrance face, and K represents an absorption coefficient of the light-absorbing member.

6. An optical apparatus as claimed in claim 1,
    wherein the prism is an optical-path-separating prism that directs illumination light to the modulator and that transmits the light deflected in the first direction by the modulator.

7. An optical apparatus as claimed in claim 6,
    wherein the illumination light is separated by use of a color wheel into light of different colors that appear cyclically one color after another.

8. An optical apparatus as claimed in claim 1,
    wherein the prism is a color-separating prism that directs illumination light to the modulator and transmits the light deflected in the first direction by the modulator, and wherein the prism also separates the light into light of different wavelength ranges.

9. An optical apparatus as claimed in claim 8,
    wherein, the modulator is a plurality of modulators equal in number to a number of wavelength ranges into which the light is separated.

10. A projector comprising:
    an illumination optical system that includes a light source and that emits illumination light generated by the light source;
    a reflection-type spatial light modulator having a plurality of minute variable-reflection-angle mirrors, the mirrors individually deflecting the illumination light emitted from the illumination optical system in one of two different directions, namely in a first direction or in a second direction, in accordance with a signal fed in;
    a projection optical system to which light deflected in the first direction by the modulator is directed;
    a first prism disposed between the modulator and the optical system so as to direct the illumination light emitted from the illumination optical system to the modulator, direct the light deflected in the first direction by the modulator to the optical system, and direct light deflected in the second direction by the modulator to a side face of a second prism; and
    a light-absorbing member shaped like a plane-parallel plate and disposed with an entrance face thereof kept in close contact with a side face of the second prism, the light-absorbing member being so designed that the light deflected in the second direction by the modulator enters the light-absorbing member through the entrance face thereof but does not exit from the light-absorbing member through the entrance face back into the second prism, and a non-planar heat-dissipating member disposed along a rear face of the light-absorbing member such that said light-absorbing member is between the heat-dissipating member and the second prism.

11. A projector as claimed in claim 10, wherein the light-absorbing member acts on light within a wavelength range of visible light.

12. A projector as claimed in claim 10, wherein the light-absorbing member is made of a medium that has a refractive index higher than a medium of which the prism is made.

13. A projector comprising:

an illumination optical system that includes a light source and that emits illumination light generated by the light source;

a reflection-type spatial light modulator having a plurality of minute variable-reflection-angle mirrors, the mirrors individually deflecting the illumination light emitted from the illumination optical system in one of two different directions, namely in a first direction or in a second direction, in accordance with a signal fed in;

a projection optical system to which light deflected in the first direction by the modulator is directed;

a prism disposed between the modulator and the optical system so as to direct the illumination light emitted from the illumination optical system to the modulator, direct the light deflected in the first direction by the modulator to the optical system, and direct light deflected in the second direction by the modulator to a side face of the prism; and a light-absorbing member shaped like a plane-parallel plate and disposed with an entrance face thereof kept in close contact with the side face of the prism, the light-absorbing member being so designed that the light deflected in the second direction by the modulator enters the light-absorbing member through the entrance face thereof but does not exit from the light-absorbing member through the entrance face back into the prism, wherein the light-absorbing member is so designed that a distance t between the entrance face and a second flat face opposite to the entrance face fulfills the following condition:

$$t \geq [1-\{(n_1/n_2)\sin \alpha_1\}^2]^{1/2}/2K$$

where $n_1$ represents a refractive index of the prism, $n_2$ represents a refractive index of the light-absorbing member, $\alpha_1$ represents a minimum angle of incidence of light incident on the entrance face, and K represents an absorption coefficient of the light-absorbing member.

14. A projector as claimed in claim 10, wherein the illumination optical system has a color wheel and the illumination light is separated by use of the color wheel into light of different colors that appear cyclically one color after another.

15. A projector as claimed in claim 10, wherein the prism is a color-separating prism that directs the illumination light to the modulator and transmits the light deflected in the first direction by the modulator, and wherein the prism also separates the light into light of different wavelength ranges.

16. A projector as claimed in claim 15, wherein, the modulator is a plurality of modulators equal in number to a number of wavelength ranges into which the light is separated.

17. An optical apparatus comprising:

a reflection-type spatial light modulator having a plurality of minute variable-reflection-angle mirrors, the mirrors individually deflecting light incident thereon in one of two different directions, namely in a first direction or in a second direction, in accordance with a signal fed in;

an optical system to which light deflected in the first direction by the modulator is directed;

a first prism disposed between the modulator and the optical system so as to direct the light deflected in the first direction by the modulator to the optical system and direct light deflected in the second direction by the modulator to a side face of a second prism;

a light-absorbing member shaped like a plane-parallel plate and disposed with an entrance face thereof kept in close contact with the side face of the second prism, the light-absorbing member being so designed that the light deflected in the second direction by the modulator enters the light-absorbing member through the entrance face thereof but does not exit from the light-absorbing member through the entrance face back into the second prism, and wherein the light-absorbing member has a thickness which provides that light entering the light-absorbing member decays in no more than one reflection.

18. An optical apparatus according to claim 17, wherein the light-absorbing member is positioned substantially perpendicular to the reflection-type spatial light modulator.

19. An optical apparatus according to claim 1, wherein the light-absorbing member is positioned substantially between the second prism and the non-planar heat-dissipating member.

20. An optical apparatus comprising:

a reflection-type spacial light modulator;

a first prism having a totally internally reflective surface for directing light entering the first prism toward the reflection-type spacial light modulator positioned on one side of the first prism, the reflection-type spacial light modulator adapted to direct light reflected from the totally internally reflective surface of the first prism in one of a first direction and a second direction different than the first direction;

a projection optical system substantially opposite the reflection-type spacial light modulator, the projection optical system for receiving light directed in the first direction;

a second prism substantially between the first prism and the projection optical system; and a light-absorbing member being positioned along one side of the second prism substantially perpendicular to the reflection-type light modulator, the light-absorbing member adapted to receive light directed in the second direction, and the light-absorbing member having a comb-shaped heat dissipating portion.

21. An optical apparatus according to claim 20, wherein the light-absorbing member has a thickness which provides for a no more than one reflection decay of light entering the light-absorbing member.

22. An optical apparatus according to claim 1, wherein the light-absorbing member is substantially perpendicular to the reflection-type spatial light modulator.

23. A projector comprising:

an illumination optical system that includes a light source and that emits illumination light generated by the light source;

a reflection-type spatial light modulator having a plurality of minute variable-reflection-angle mirrors, the mirrors individually deflecting the illumination light emitted from the illumination optical system in one of two different directions, namely in a first direction or in a second direction, in accordance with a signal fed in;

a projection optical system to which light deflected in the first direction by the modulator is directed;

a first prism disposed between the modulator and the optical system so as to direct the illumination light emitted from the illumination optical system to the modulator, direct the light deflected in the first direction by the modulator to the optical system, and direct light deflected in the second direction by the modulator to a side face of a second prism; and a light-absorbing member shaped like a plane-parallel plate and disposed with an entrance face thereof kept in close contact with a side face of the second prism, the light-absorbing member being so designed that the light deflected in the second direction by the modulator enters the light-absorbing member through the entrance face thereof but does not exit from the light-absorbing member through the entrance face back into the second prism, and wherein the light-absorbing member has a thickness which provides that light entering the light-absorbing member decays in no more than one reflection.

24. A projector according to claim 23, wherein the light-absorbing member is substantially perpendicular to the reflection-type spatial light modulator.

25. A projector according to claim 10, wherein the light-absorbing member is substantially perpendicular to the reflection-type spatial light modulator.

26. An optical apparatus according to claim 1 wherein the non-planar heat dissipating member is a multi-toothed heat dissipating member.

27. A projector according to claim 10, wherein the non-planar heat dissipating member is a multi-toothed heat dissipating member.

* * * * *

UNITED STATES PATENT AND TRADEMARK OFFICE
CERTIFICATE OF CORRECTION

PATENT NO.   : 6,357,878 B1
DATED        : March 19, 2002
INVENTOR(S)  : Shigeru Sawamura It is certified that error appears in the above-identified patent and that said Letters Patent is hereby corrected as shown below:

Column 9,
Line 26, after "prism", insert -- and a second prism, said first prism being --.
Line 29, after "and", insert -- to --.
Line 30, delete the second instance of "a", and insert -- the --.
Line 37, delete "liht-absorbing", and insert -- light-absorbing --.
Line 53, after "the", insert -- second --.
Line 65, after "and", insert -- to --.

Column 10,
Lines 10 and 11, delete "second flat face opposite to the entrance face,", and insert -- second face which is flat and is opposite to the entrance face, --.
Line 21 after "the", insert -- first --.
Line 30, delete "wherein the prism", and insert -- further comprising a third prism which --.
Line 33, after the first instance of "the", insert -- third --.
Line 33, after the second instance of "the", insert -- illumination --.
Line 38, after "the", insert -- illumination --.
Line 52, after "prism", insert -- and a second prism, said first prism being --.
Line 58, delete "a", and insert -- the --.
Line 61, delete "a", and insert -- said --.

Column 11,
Line 11, after "the", insert -- second --.
Lines 41 and 42, delete "second flat face opposite to the entrance face", and insert -- second face, which is flat and is opposite to the entrance face, --.
Lines 58 and 59, delete "claim 10, wherein the prism", and insert -- claim 10, further comprising a third prism which --.
Line 62, after the first instance of "the", insert -- third --.
Line 62, after the second instance of "the", insert -- illumination --.
Line 67, after "the", insert -- illumination --.

UNITED STATES PATENT AND TRADEMARK OFFICE
CERTIFICATE OF CORRECTION

PATENT NO. : 6,357,878 B1
DATED : March 19, 2002
INVENTOR(S) : Shigeru Sawamura

It is certified that error appears in the above-identified patent and that said Letters Patent is hereby corrected as shown below:

Column 12,
Line 30, delete "claim 1,", and insert -- claim 17, --.
Lines 34 and 35, after "comprising:", insert -- a first prism; --.
Line 35, delete "spacial", and insert -- spatial --.
Line 35, after "modulator", delete ";", and insert -- positioned on one side of the first prism --;
Line 36, delete the first instance of "a", and insert -- the --.
Line 38, delete "spacial", and insert -- spatial --.
Lines 38, and 39, delete "positioned on one side of the first prism".
Line 39, delete "spacial", and insert -- spatial --.
Line 40, after "modulator", insert -- being --.
Line 44, after "system", insert -- , positioned --.
Line 45, delete "spacial", and insert -- spatial --.
Lines 45 and 46, delete "[the projection optical system]".
Line 48, after the first instance of "prism", insert -- positioned --.
Line 59, delete "[a]".

Column 13,
Line 8, after "directed;", insert -- a first prism; -- and --a second prism --.
Line 9, delete "a", and insert -- the --.
Line 9, after "prism", insert -- being --.
Line 15, delete "a", and insert -- the --.
Line 18, delete "a", and insert -- said --.

Signed and Sealed this

Seventh Day of January, 2003

JAMES E. ROGAN
*Director of the United States Patent and Trademark Office*